S. BARKER.

Axle.

No. 59,162.

Patented Oct. 30, 1866.

Witnesses.

Inventor.
Silas Barker
His atty
John E. Earle

UNITED STATES PATENT OFFICE.

SILAS BARKER, OF HARTFORD, CONNECTICUT.

IMPROVEMENT IN CARRIAGE-AXLES.

Specification forming part of Letters Patent No. 59,162, dated October 30, 1866.

*To all whom it may concern:*

Be it known that I, SILAS BARKER, of Hartford, in the county of Hartford and State of Connecticut, have invented a new Improvement in Carriage-Axles; and I do hereby declare the following, when taken in connection with the accompanying drawings and the letters of reference marked thereon, to be a full, clear, and exact description of the same, and which said drawings constitute part of this specification, and represent, in—

Figure 1:
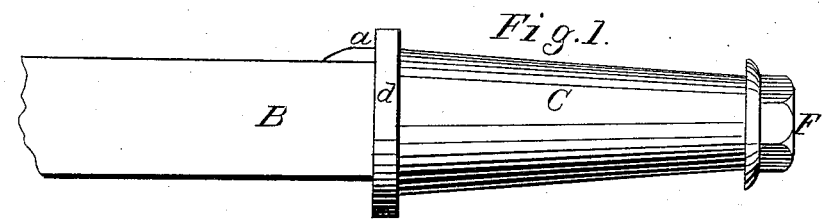
Figure 2:
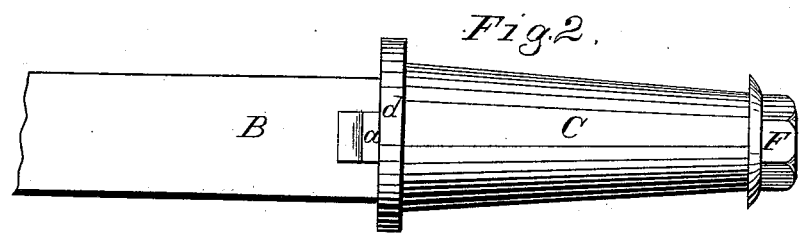
Figure 3:
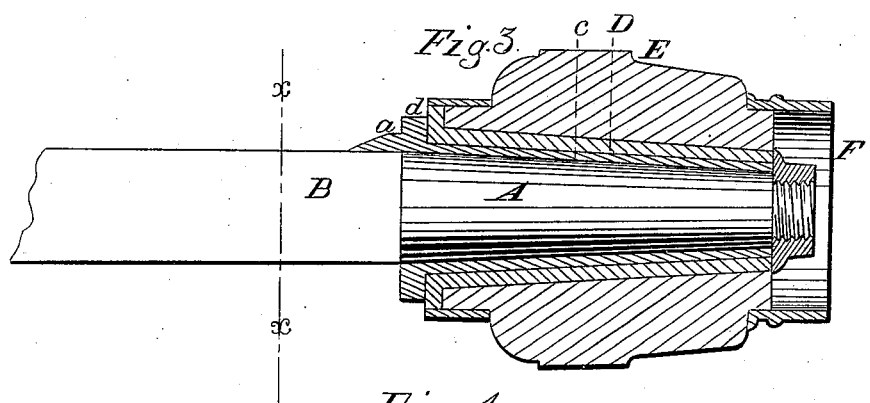
Figure 4:
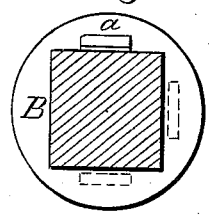

Figure 1, a side view of an axle with my improvement thereon; Fig. 2, a top view of the same; Fig. 3, a sectional view, showing the axle as in the hub; and in Fig. 4, a sectional view of the axle on line *x x*, looking to the right.

As heretofore constructed the wear upon the axle is entirely upon the under side, as upon this point the entire bearing of the carriage is confined, the upper side of the axle not receiving any wear; consequently the axle is soon worn out of its proper shape.

To construct an axle which may be so adjusted as to be worn evenly upon all sides is the object of my invention, which consists in forming a sleeve closely fitting the axle, and attached thereto so that it cannot be revolved thereon, but so that the said sleeve may at times be turned partially around upon the axle for the purpose of changing the bearing from one point to another, the said sleeve fitted to the box in the wheel in like manner as the common axle now is; and that others may be enabled to construct and use my improvement, I will proceed to describe the same, as illustrated in the accompanying drawings.

A is the axle, formed upon a square bar, B, in the usual manner. Over the said axle I place a sleeve, C, fitting closely the axle, its inner end provided with a lip, *a*, so as to lie upon one of the flat sides of the part B, as seen in the drawings. This lip prevents the sleeve C from being turned upon the axle when it is set in its proper position against the shoulder of the axle, as seen in Fig. 3; but by withdrawing the sleeve from the axle, or partially so, the sleeve may be turned so that the lip will lie upon either side, as denoted in colors, Fig. 4. I form a shoulder, *d*, on the sleeve, against which the wheel revolves.

D is the box, placed within the hub E, and secured therein in the usual manner, the said box being fitted to the sleeve C in like manner as to the common axle, and when placed on the sleeve a nut, F, turned onto a thread upon the axle secures the wheel in its proper position, in the usual manner.

It will be readily seen that the sleeve C may be easily and frequently adjusted, so that the bearing will come upon different points of its surface, and thus cause the wear to be alike, or nearly so at all points, and the axle consequently much more durable.

Another great advantage which my improvement has over the common axle arises from the fact that should the axle become dry and heated, as is frequently the case, it can be readily removed, the sleeve being removed with the wheel, and thus quickly cooled and readjusted, whereas in the common axle much difficulty is experienced in removing the wheel from the axle.

I have described my invention as applied to carriage-axles only; yet it is applicable alike to all axles upon which wheels, &c., are caused to revolve.

I have described the sleeve as formed with a lip, *a*, to prevent its turning upon the axle. This is a convenient and satisfactory manner for accomplishing this object; yet many other devices for accomplishing the same may be employed. I therefore do not confine myself to this precise manner of adjustment; but, Having fully described my invention, what I claim as new and useful, and desire to secure by Letters Patent, is—

The combination of a sleeve, C, with an axle, A, when the said sleeve is constructed and arranged so as to be adjusted thereon, substantially in the manner and for the purpose specified.

SILAS BARKER.

Witnesses:
JOHN E. EARLE,
ALTSIE J. TIBBITS.